US005410607A

United States Patent [19]

Mason et al.

[11] Patent Number: 5,410,607

[45] Date of Patent: Apr. 25, 1995

[54] METHOD AND APPARATUS FOR REDUCING NOISE RADIATED FROM A COMPLEX VIBRATING SURFACE

[75] Inventors: V. Bradford Mason, Palo Alto; Koorosh Naghshineh, Cupertino, both of Calif.

[73] Assignee: SRI International, Menlo Park, Calif.

[21] Appl. No.: 126,493

[22] Filed: Sep. 24, 1993

[51] Int. Cl.[6] .............................................. G01K 11/16

[52] U.S. Cl. .............................................. 381/71

[58] Field of Search .............................................. 381/71, 94

[56] References Cited

U.S. PATENT DOCUMENTS

| | | | |
|---|---|---|---|
| 2,776,020 | 1/1957 | Conover et al. | 381/71 |
| 4,025,724 | 5/1977 | Davidson, Jr. et al. | 381/71 |
| 4,573,189 | 2/1986 | Hall | 381/96 |
| 4,727,584 | 2/1988 | Hall | 381/96 |
| 4,868,870 | 9/1989 | Schrader | 381/96 |
| 5,010,576 | 4/1991 | Hill | 381/71 |
| 5,033,082 | 7/1991 | Eriksson et al. | 379/410 |
| 5,140,640 | 8/1992 | Graupe et al. | 381/71 |
| 5,253,486 | 10/1993 | Sugahara et al. | 381/71 |

OTHER PUBLICATIONS

"Active Structural Acoustic Control", Acoustics 1991, vol. 91, No. 1, p. 519.

"Recent Advances in Active Noise Control", AIAA Journal, vol. 29, No. 7, pp. 1058–1067.

"Recent Advances in Active Noise Control", Second International Congress on Recent Developments in Air-and Structure-Borne Sound and Vibration, Mar. 4–6, 1992, Auburn University, USA.

"Active Attenuation of Acoustic Noise: Past, Present, and Future", Ashrae Transactions 1989, vol. 95, Part 2, pp. 63–76.

"Active Noise Control Systems", IEE Review, Jun. 1987, vol. 134, Part A, No. 6, pp. 525–546.

"Full-Scale Demonstration Tests of Cabin Noise Reduction Using Active Vibration Control", J. Aircraft Mar. 1991, vol. 28, pp. 209–215.

"In-Flight Experiments on the Active Control of Propeller-Induced Cabin Noise", Journal of Sound and Vibration 1990, vol. 140, No. 2, pp. 219–238.

"Active Noise Control to Reduce the Blade Tone Noise of Centrifugal Fans", Journal of Vibration, Acoustics, Stress, and Reliability in Design Jul. 1988, vol. 110, pp. 377–383.

"Active Attenuation of Noise-The State of the Art", Noise Control Engineering May–Jun. 1982, vol. 18. No. 3, pp. 100–110.

"A Systems Approach to Appliance Compressor Quieting Using Active Noise Control Techniques", D. G. Smith, M. F. Arnold, E. W. Ziegler, Fr., Kh. Eghtesadi, pp. 317–324.

*Primary Examiner*—Forester W. Isen

*Attorney, Agent, or Firm*—Hickman & Beyer

[57] ABSTRACT

An apparatus for reducing noise radiated from a complex vibrating surface includes: a motion sensor responsive to a region of the vibrating surface that contributes to a noise field in a fluid medium; a controller having a substantially fixed transfer function, where the controller is responsive to an electrical motion signal produced by the motion sensor and is operative to produce an electrical antinoise signal; and an acoustic driver responsive to the electrical antinoise signal and operative to produce and an acoustic antinoise field that is substantially 180° out-of-phase with the original noise field. The antinoise field reduces the original noise field by the process of destructive interference without substantially affecting the motion of the vibrating surface. If the medium is air, the acoustic driver is preferably a loudspeaker which is operated so that its cone velocity is approximately equal to the ratio of a noise-source area weighting to a cone area weighting multiplied by the velocity of the noise source. A method for reducing noise radiated from a complex vibrating surface in accordance with the present invention includes: dividing the vibrating surface into a plurality of regions, each of which contributes to a noise field in a fluid medium; and, for each region of the vibrating surface, developing an antinoise field that effectively reduces the original noise field associated with that region. The plurality of antinoise fields provides wideband noise reduction in a quiet zone of arbitrary size and shape.

18 Claims, 6 Drawing Sheets

METHOD AND APPARATUS FOR REDUCING NOISE RADIATED FROM A COMPLEX VIBRATING SURFACE

BACKGROUND OF THE INVENTION

This invention relates generally to active noise control and more particularly to active suppression of acoustic radiation from a complex vibrating surface.

Traditional methods of passive noise control include placing the noise source on shock mounts or in an enclosure, redesigning the moving parts of a noisy machine, constructing physical barriers between offending noise sources and human listeners, and using sound-absorbing materials to reduce reverberations, e.g. in large rooms. These methods are most effective at frequencies above about 500 Hz, where the wavelengths are relatively short. Low-frequency noise is more difficult to control by passive means because its wavelengths generally exceed the dimensions of practical barriers and other acoustical treatments.

Many noise problems that cannot be solved by passive methods are candidates for active noise control, which is based on the principle of destructive interference. In a designated "quiet zone," the undesired noise is mixed with electronically generated "antinoise," which has the same amplitude as the original noise but the opposite phase. Thus, the two noise fields tend to cancel each other over a specified frequency band. The required accuracy for generating the correct antinoise is inversely related to frequency, so that, in practice, active noise control is especially useful for attenuating low-frequency noise. It follows from this discussion that passive and active methods of noise control are complimentary.

The prior art of active noise control comprises two classes of methods and apparatus: single-channel and multichannel control systems.

Single-channel controllers have an input called the reference signal, which represents the undesired noise. The reference signal may be a predetermined waveform (for periodic noise) or derived from an input sensor such as a microphone (for random noise). The controller has a single output that is fed to an output transducer (such as a loudspeaker) to produce the required antinoise. Controllers of this kind usually implement algorithms that provide a model of the acoustical plant, which may include a feedback path from the output transducer to the input sensor. There is a second input called the error signal, which describes the performance achieved in the quiet zone. The error signal is used to adapt the model in such a manner as to minimize the residual noise.

Depending on the application, the reference signal may be a tone or broadband noise. In U.S. Pat. No. 5,010,576, Hill provides an example of a single-channel controller that uses a tone as the reference signal. An accelerometer attached to a fan motor tracks the blade-passage frequency of the fan noise. In this example, there is no acoustic feedback path because an accelerometer does not respond to airborne noise. A contrasting example of a controller with a broadband reference signal is given by Allie et al. in U.S. Pat. No. 4,736,431. Here a microphone placed in a ventilation duct monitors the entire spectrum of the fan noise to be canceled. A special feature of this controller is that it is calibrated automatically; the algorithm converges even if the fan noise contains tones. Regardless of the type of reference signal, the identifying feature of a single-channel system is that there is a single forward signal path through the controller.

Multichannel control systems are needed when the sound is not limited to plane waves traveling in a duct but is propagating in all directions. Multichannel controllers use many input signals that describe the spatial distribution of one or more noise sources, and many output signals that specify the antinoise required in different spatial regions of the quiet zone. The inputs are connected to the outputs by means of forward filters, which are usually implemented by finite-impulse-response digital filters. If the acoustical plant includes feedback from output transducers to input sensors, the controller must also contain neutralization filters to correct for this feedback. Properly adjusted neutralization filters provide system stability and increase system performance.

Depending on the application, multichannel controllers may also use error signals from the quiet zone to adapt the forward and neutralization filters to changes in the acoustical plant. An example of a multichannel system with many inputs and outputs is provided by Martinez et al. in U.S. Pat. No. 5,224,168. Regardless of the particular configuration, the identifying feature of a multichannel controller is that at least one input is connected to two or more outputs by means of separate forward filters. In a fully interconnected controller, each input is connected to all outputs, and the number of forward filters is equal to the number of inputs multiplied by the number of outputs.

SUMMARY OF THE INVENTION

The present invention includes an active method for reducing the noise field produced in a fluid medium by a complex vibrating structure that contacts or encloses the medium. As such, the present invention offers a practical solution to a generic noise problem: reducing spatially distributed, wideband noise radiated from a complex vibrating surface. For example, the method addresses the noise field in an aircraft cabin, which is generated primarily by vibrations of the fuselage. The method considers the complex vibrating surface as being composed of many discrete regions, each a separate source of wideband random noise. The method uses a plurality of active devices to separately treat the contributions of each region to the overall noise field. The method thus provides a field of antinoise that closely matches the original noise field over a wide spatial region.

This invention also includes a noise-reduction apparatus that is attached to each region of the vibrating surface to control local acoustic emissions. The apparatus consists of three major components: a motion sensor, a single-channel controller, and an acoustic driver. The motion sensor is responsive to the vibrations of a particular region, and may be, for example, an accelerometer that is mounted directly on the vibrating structure. Using the signal from the motion sensor as input, the controller specifies an output which, when applied to the acoustic driver, produces the required antinoise. The controller has a substantially fixed transfer function, and ensures that the piston of the acoustic driver is approximately 180° out-of-phase with the incremental vibrating surface. When the medium is air, the acoustic driver is likely to be a conventional loudspeaker.

As is evident from the above discussion, the apparatus is designed to reduce the noise field in the medium without altering the structural vibrations that create the noise field. For quieting aircraft cabins, this feature has three important advantages over the prior art. First, a loudspeaker is much lighter and less expensive than a "shaker", which would otherwise be required to counteract local fuselage vibrations. As is well known to those skilled in the art, a shaker is an electromechanical device which imparts a mechanical force on an object to cause vibrations in that object. Second, attempts to alter vibrations at one location would also affect vibrations at other locations, so that a fully-interconnected controller would be required to stabilize the system. Third, the use of multiple shakers could eventually lead to metal fatigue and thus compromise the structural integrity of an aircraft.

A method for reducing noise radiated by a vibrating surface in accordance with the present invention includes the steps of: (a) developing an electrical motion signal that accurately describes the mechanical movement of the vibrating surface which produces a noise field in a fluid medium; (b) transforming the electrical motion signal into an electrical antinoise signal by means of a substantially fixed transfer function, the electrical antinoise signal being of such polarity that, when applied to an acoustic driver, the driver surface is approximately 180° out-of-phase with the vibrating surface; and (c) transforming the electrical antinoise signal into an antinoise sound field by means of a suitable transducer. The antinoise, field reduces the original noise field in the fluid medium without substantially affecting the movement of the vibrating surface.

A method for reducing noise radiated by a vibrating surface in accordance with the present invention also includes the steps of: (a) dividing the vibrating surface into a plurality of local regions, where each region contributes to the noise field in the fluid medium; and (b) developing, for each selected region, a field of antinoise that at least partially reduces the noise field produced by that region without substantially affecting other noise fields produced by neighboring regions of the vibrating surface.

As is well known to those skilled in the art, the size of a quiet zone is proportional to the separation between the source of undesired noise and the source of antinoise; if it were possible to superimpose these two sources, the quiet zone would extend continuously in all directions. In the present invention, each acoustic driver radiating antinoise is placed in close proximity to a small region of the vibrating surface that constitutes a separate noise source. Thus, a major advantage of the present invention is that it provides global quieting in the fluid medium by providing and acoustic driver radiating antinoise in close proximity to each of a number of small regions of the vibrating surface.

The present invention is also advantageous in that an apparatus built according to this invention can be used in large arrays to create quiet zones of arbitrary size and shape, unlike single-channel systems, which cannot be connected together to increase the size of the quiet zone because of mutual interference. In the present invention, mutual interference is minimized because there is negligible feedback between the acoustic drivers and the motion sensors, thereby greatly improving system stability.

Another advantage of the present invention is that it utilizes a plurality of relatively simple active devices to accomplish the same task as a complex, and therefore costly, multichannel active noise-control system of the prior art. The devices of the present invention have a broad frequency response and will reduce both wideband and tonal noise.

Those skilled in the art will appreciate that the present invention provides effective noise reduction with active devices that are of reduced size, weight, cost, and complexity. A system built according to this invention is expected to be more reliable than a system with a central controller because the individual devices operate independently of each other such that the loss of one or more units will not affect the functionality of the remaining units.

Since the apparatus of the present invention are attached to the vibrating surface, their intrusion into the desired quiet zone is minimized. This is advantageous in confined areas, such as an aircraft cabin, where Space is a premium. In contrast, the prior art requires that a plurality of microphones and loudspeakers be placed within close proximity of each quiet zone, which may be so small as to include only one passenger's head. This invention provides much larger quiet zone because each apparatus producing antinoise is located very close to a source of the undesired noise, namely a region of the vibrating surface.

These and other advantages of the: present invention will become apparent upon reading the following detailed descriptions and studying the various figures.

DETAILED DESCRIPTION OF THE PREFERRED EMBODIMENTS

Figure 1:
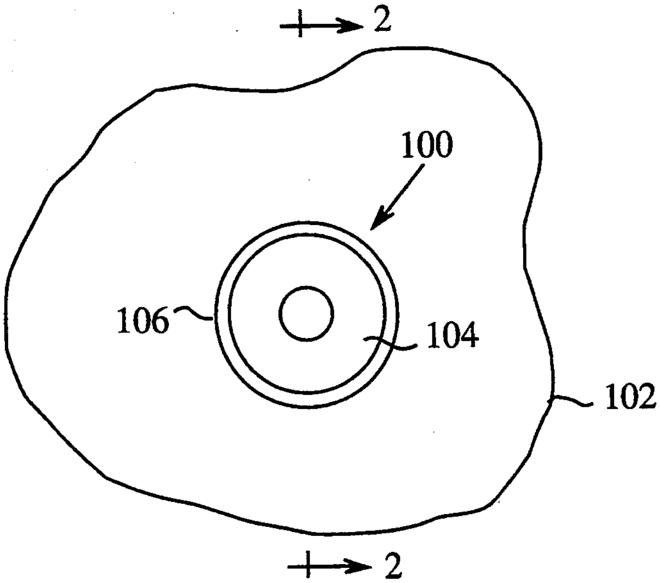
FIG. 1 is a front elevational view of an active noise-reduction apparatus in accordance with the present invention attached to a vibrating surface.

FIG. 1 shows an apparatus 100 for reducing noise radiation from a vibrating surface 102. Apparatus 100 includes an acoustic driver 104 that is seated within an enclosure 106 attached to vibrating surface 102. The acoustic driver 104 is an output transducer which is excited by an electrical input signal to develop a mechanical output. The acoustic driver 104 is preferably a loudspeaker having a predetermined piston area (cone area) and a piston motion being dependent upon the electrical input signal.

Figure 2:
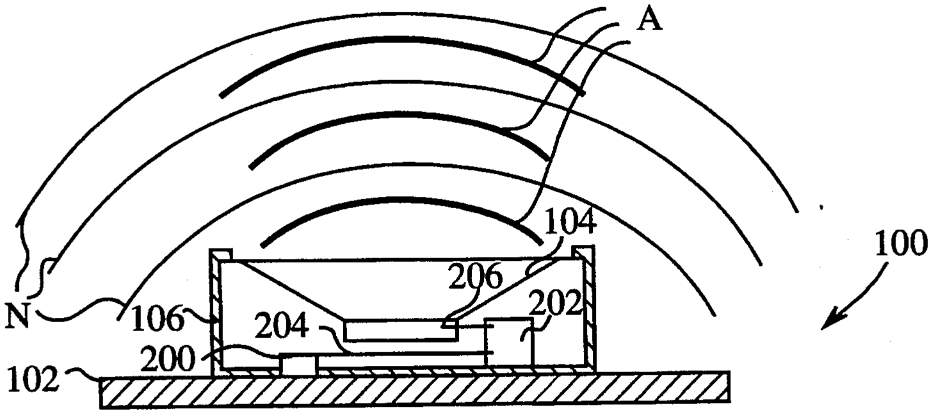
FIG. 2 is a cross-sectional view taken along line 2—2 of FIG. 1.

FIG. 2 is a cross-sectional view taken along line 2—2 of FIG. 1. Apparatus 100 further includes a motion sensor 200 and a controller 202. Motion sensor 200 is shown here to be attached directly to vibrating surface 102 through an opening in the bottom of enclosure 106. Alternatively, motion sensor 200 can be attached to the bottom of enclosure 106, and the enclosure 106 can be firmly attached to the vibrating surface 102.

The motion sensor 200 can be attached to the surface 102 by a variety of methods such as by means of an adhesive, by spot welding, by brazing, by soldering, with mechanical fasteners, etc. A bolt 201 is shown in FIG. 2 mechanically coupling the motion sensor 200 to the surface 102. Alternatively, many accelerometers are provided with a threaded stud which can be engaged with a threaded bore provided in the vibrating surface 102. Enclosure 106 containing acoustic driver 104 need not be mechanically coupled to vibrating surface 102, but these components should be placed in close proximity of vibrating surface 102. Therefore, preferably, enclosure 106 is attached to the vibrating surface 102 in a conventional manner.

Although the controller 202 does not have to be inside enclosure 106, it is preferred that controller 202, acoustic driver 104, and motion sensor 200 are all within enclosure 106. Motion sensor 200 is electrically connected to controller 202 by conductors 204, and controller 202 is electrically connected to acoustic driver 104 by conductors 206. The power supply for apparatus 100 is not shown. It may be any conventional supply, such as a battery, a generator, or a power line.

In operation, motion sensor 200 senses the movement of vibrating surface 102 and converts this movement into an electrical motion signal on conductors 204. This electrical motion signal is transformed within controller 202 to produce an electrical antinoise signal on conductors 206. This electrical antinoise signal excites the acoustic driver 104 such that the motion of its piston (e.g. the motion of the cone of a loudspeaker) is substantially 180° out-of-phase with the motion of the vibrating surface after compensating for the sound propagation delay from the vibrating surface to the acoustic driver piston. Therefore, a noise wavefront N produced by vibrating surface 102 can be at least partially canceled by an antinoise wavefront A produced by acoustic driver 104, where the noise wavefront N and the antinoise wavefront A are of substantially the same amplitude and are substantially 180° out-of-phase. Motion sensor 200 may sense the motion of a vibrating structure at a single point or over a region of the vibrating surface. This may be accomplished by the use of a single motion sensor, a plurality of motion sensors, or a motion sensor that is responsive to motion over a large area.

The operation of the device described here follows basic acoustic principles. In general, vibrating structures radiate sound only if there exists a net volume of fluid that is displaced by the structural vibration at a fast rate at the structural-fluid interface. The rate at which this volume is displaced is referred to as the volume velocity of the sound source. For uniformly vibrating structures, it is expressed as the, product of the surface structural velocity and the structural area. A complex vibrating structure (one that has a non-uniformly varying surface structural velocity) is, in this invention, divided into a set of essentially uniformly vibrating regions. The sound pressure radiated from each region is related to the volume velocity of each region.

In the present invention, acoustic drivers are placed on a vibrating structure and energized such that the net volume velocity of the structure within the region surrounding each acoustic driver is very small. Accordingly,, the total net volume velocity of the structure will be very small and the resulting a structure will radiate very little sound. Thus, a complex vibrating surface can be conceptually divided into smaller vibrating regions that can each be treated independently of each other to minimize the net volume velocity of the whole vibrating structure.

Although the above principle of operation is based on adjusting the net volume velocity of the vibrating structure, it is important to note that, in general, there is a direct and linear relationship between structural velocity, structural acceleration, and displacement. Thus, any one of these measures can be used, in conjunction with knowledge of the effective area of the acoustic driver and the individual structural regions being treated, to determine the proper electrical antinoise signal for the acoustic driver. In the embodiment described here, structural acceleration is the chosen motions sensing measure, and thus the term "volume acceleration" will be used.

Figure 3:
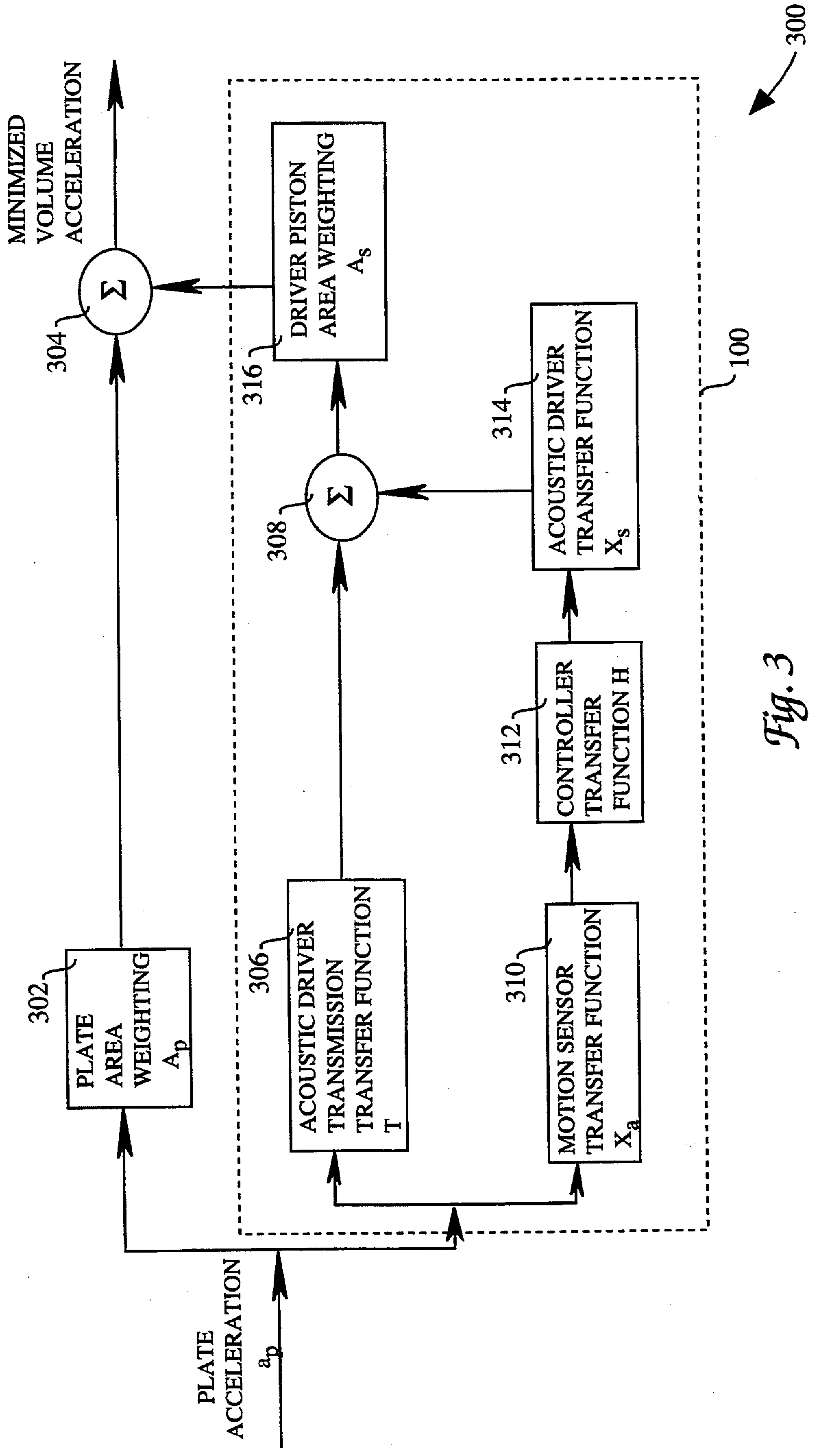
FIG. 3 is a block diagram of an acoustical model of the active noise-reduction apparatus of the present invention.

FIG. 3 is a frequency-domain acoustical model 300 of the system involving apparatus 100 depicted in FIGS. 1 and 2. Hereafter, vibrating surface 102 will be additionally referred to as a "plate," it being understood that the vibrating structure can be of virtually any shape. For example, the vibrating structure may be a curved portion of a fuselage of an aircraft. Therefore, when the term plate is used, it will be appreciated that vibrating structures of any shape or size are, for purposes of this invention, equivalent.

Acoustical model 300 begins with the plate acceleration $a_p$. Plate acceleration $a_p$ is amplified by a transform 302 that includes the plate area weighting $A_p$. The output of transform 302 is one of two inputs of a summation 304. Plate acceleration $a_p$ is also an input to a transform 306 that is the acoustic driver transmission transfer function T. The output of transform 306 is one of two inputs of a summation 308. Plate acceleration $a_p$ is further applied to a transform 310 that is the motion-sensor transfer function $X_a$. The output of transform 310 is applied to a transform 312 that is the controller transfer function H. The output of transform 312 is applied to a transform 314 that is the acoustic driver transfer function $X_s$. The output of transform 314 forms the second input into summation 308, and the resultant of summation 308 is applied to a transform 316 representing the effective piston area $A_s$ of acoustic driver 104. The output of transform 316 forms the second input into summation 304. The resultant of summation 304 is the minimized volume acceleration for the system. By minimizing the volume acceleration, the volume velocity is also minimized, and thereby the noise radiated from the vibrating structure is reduced.

For a small region of the complex vibrating structure, the transform 302 is essentially a constant equal to the plate area minus the driver piston area. The motion-sensor transfer function 310 may be provided by the manufacturer, obtained by comparison to a known standard motion sensor, or measured by applying a known motion excitation to the motion sensor and measuring the electrical output. The acoustic-driver transmission transfer function 306 (T) is the driver piston acceleration, with zero input voltage, due to the driver mounting excitation. This response can be measured, or can be assumed to be unity based on the assumption that with zero applied voltage the relative motion between the driver piston and enclosure 106 is negligible. The acoustic-driver transfer function 314 ($X_s$) can be measured by applying a known electrical excitation to the acoustic driver and measuring the piston acceleration using a laser vibrometer and adjusting the phase to account for the acoustic propagation delay between the piston and the vibrating surface. The driver piston area weighting function 316 ($A_s$) can be assumed to be the effective moving piston area.

Acoustical model 300 forms the basis of a control algorithm for controller 202. As explained previously, vibrating surface 102 is represented as a plate having an average acceleration $a_p$. This acceleration is amplified by the plate-area weighting factor $A_p$ resulting in the acoustic noise to be canceled, i.e. $a_pA_p$. Here, the plate-area weighting factor $A_p$ is the total one-sided plate surface area minus the driver piston area. The antinoise is generated by the driver piston acceleration $a_s$, amplified by the driver piston area weighting factor, $A_s$. This driver piston acceleration results from the sum of two motions: (1) the acoustic-driver transmission response T, as measured from the plate to the driver piston with zero applied voltage; and (2) the result of exciting the acoustic driver through controller response H. $X_s$ represents the acoustic-driver voltage-to-acceleration transfer function, and $X_a$ represents the motion-sensor acceleration-to-voltage transfer function. Using this model, the controller transfer function designed to minimize the total volume acceleration is given by:

$$H = -\frac{T + A_p/A_s}{X_sX_a}.$$

Figure 4:
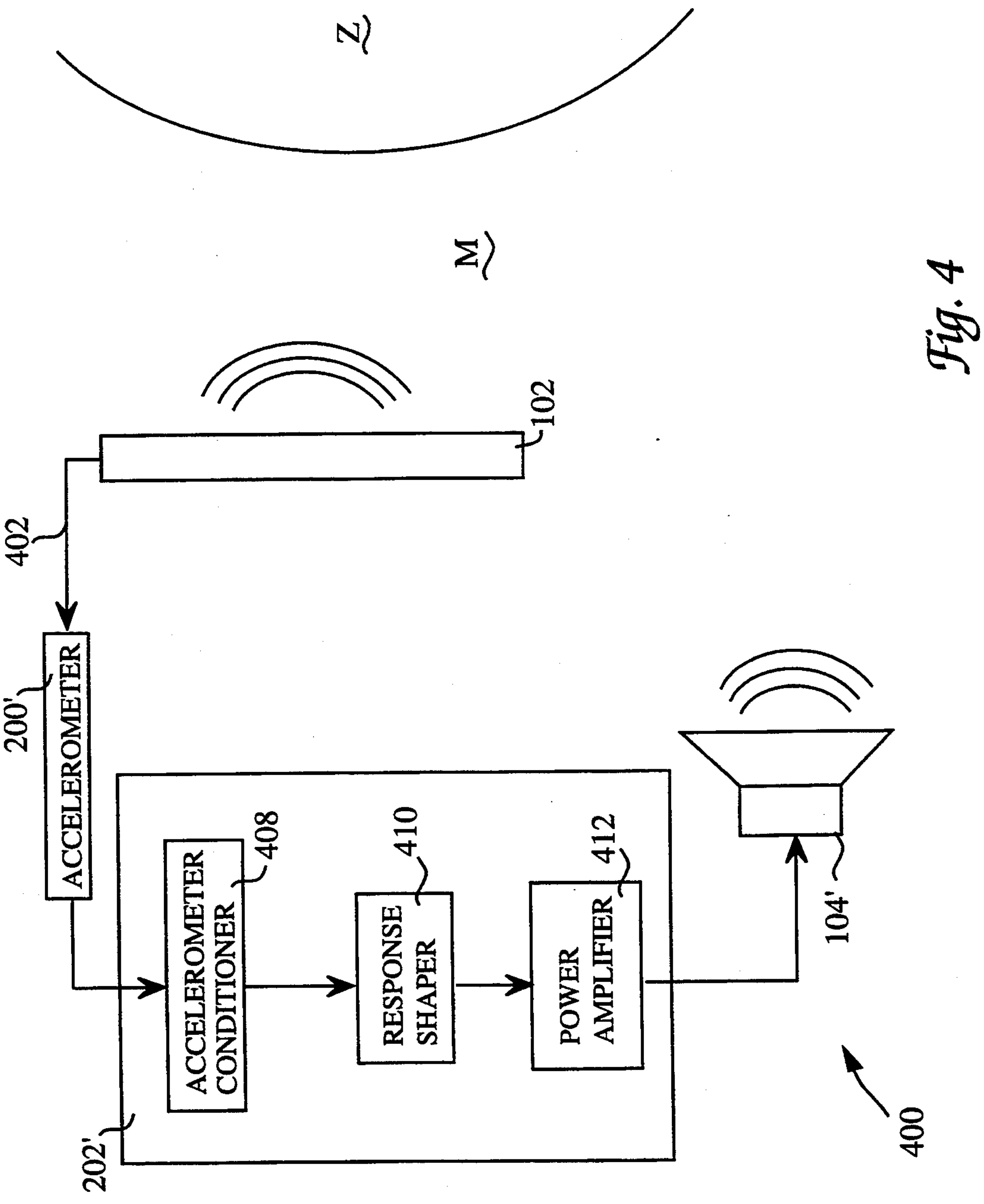
FIG. 4 is a block diagram of an active noise-reduction apparatus in accordance with the present invention.

The control algorithm developed from acoustical model 300 can be implemented in analog electronic hardware, as illustrated in FIG. 4. In a system 400, the motion sensor is an accelerometer 200' that is mechanically attached to vibrating surface 102 by means of linkage 402. In this instance, accelerometer 200' is electrically connected to a controller 202', which feeds a loudspeaker 104'. The noise produced by vibrating surface 102 is at least partially canceled by antinoise produced by loudspeaker 104' in a fluid medium M, forming quiet zone Z. In most instances the fluid medium M is simply air.

Controller 202' includes an accelerometer conditioner 408, a response shaper 410, and a power amplifier 412. The conditioner provides power to accelerometer 200', extracts the electrical motion signal, and buffers it for the response-shaping stage. Response shaper 410 provides additional circuitry to ensure that the overall control-circuit response approximates the desired response H. Power amplifier 412 boosts the signal power to drive loudspeaker 104'. Essentially, controller 202' drives the loudspeaker such that the loudspeaker cone motion is approximately 180° out-of-phase with the: plate motion, and the cone excursion amplitude is greater than the plate excursion amplitude by approximately the ratio of the plate area to the effective cone area.

Figure 5A:
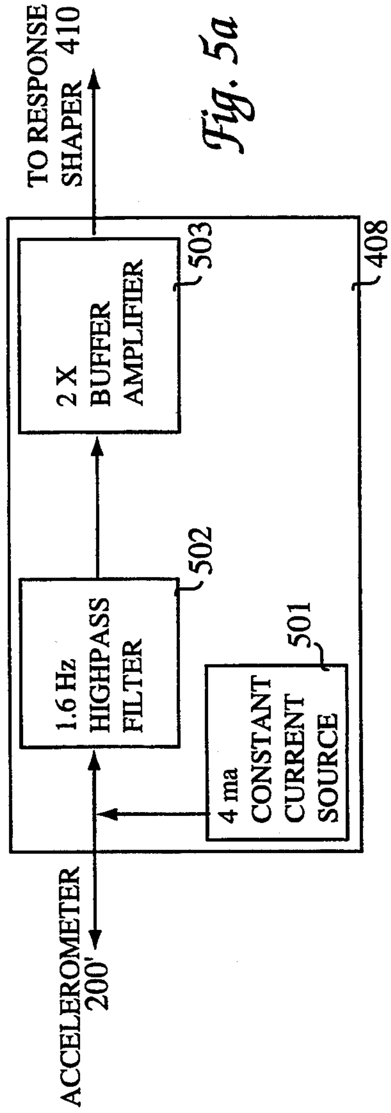
FIGS. 5*a*–5*c* are block diagrams of various portions of the controller of the present invention.
Figure 5B:
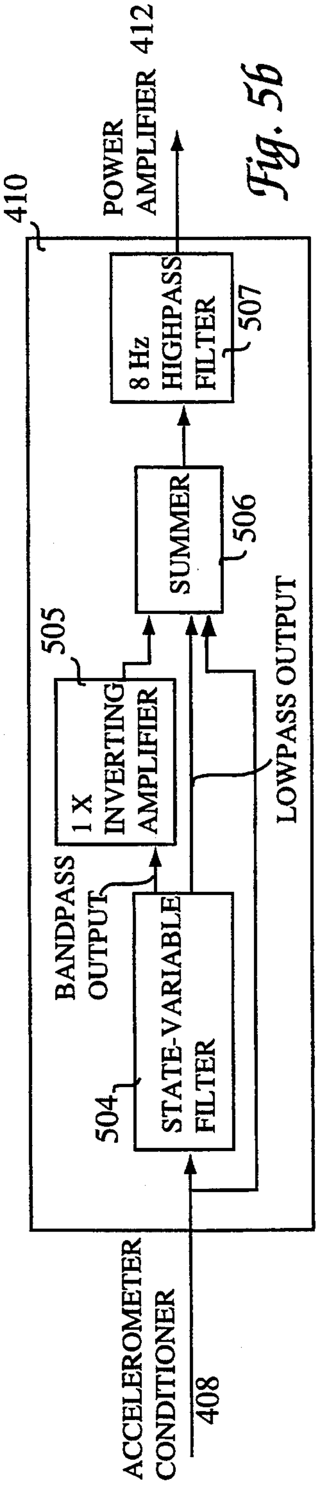
Figure 5C:
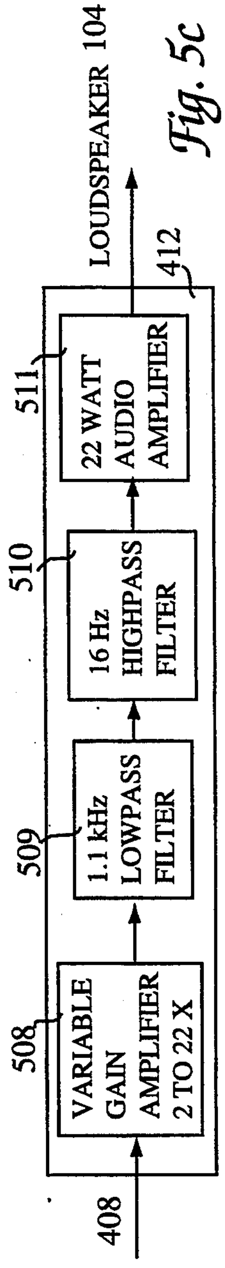

The details of the analog control circuit are shown in FIGS. 5*a*, 5*b*, and 5*c*. Accelerometer conditioner 408, shown in FIG. 5*a*, consists of a current source 501 that provides a constant 4-milliampere current to accelerometer 200', a 1.6 Hz highpass filter 502 to separate the accelerometer signal from the constant current, and a buffer amplifier 503 to buffer the signal for the next processing stage.

Response shaper 410, shown in FIG. 5*b*, provides the controller with the desired frequency-response characteristic H. This response is essentially the inverse of the acoustic-driver transfer function, which fox: a loudspeaker is typically of the form $$H(j\omega) = \alpha\frac{\omega_n^2 + 2j\zeta\omega\omega_n - \omega^2}{(\epsilon + j\omega)^2},$$

where $\alpha$ is a gain constant, $\omega_n$ is the driver loudspeaker resonant frequency, $j=\sqrt{-1}$, $\zeta$ is a damping factor, $\omega$ is the radian frequency, and $\epsilon$ is a factor used to limit the low-frequency gain of the circuit. This function is implemented using a standard state-variable filter 504, an inverting amplifier 505, a summer 506, and an 8-Hz highpass filter 507.

The output of response shaper 410 is applied to power amplifier 412 shown in FIG. 5*c*. The amplifier section consists of a variable gain amplifier 508, a 1.1k Hz lowpass filter 509, a 16 Hz highpass filter 510, and a 22-watt audio amplifier 511. Audio amplifier 511 drives loudspeaker 104 to produce the required antinoise.

For the embodiment of the present invention depicted in FIGS. 4 and 5, accelerometer 200' is commercially available as model 353A16 offered by PCB Piezotronics Inc. of Depew, N.Y. Alternatively, other motion-sensing devices may be used, including strain gages, magnetic sensors, optical sensors; (laser vibrometers and fiber-optic sensors), velocity sensors, mechanical vibrometers, and piezoelectric materials such as a PZT and PVDF. Therefore, as used herein, "coupled" or "coupling" can mean a non-physical coupling such as an optical coupling, capacitive coupling, etc. of the motion sensing device to the vibrating surface. The important requirement for motion sensor 200 is that it accurately monitors the movement of vibrating surface 102; this requirement can be fulfilled either by mounting the motion sensor directly or indirectly to the surface or by remote monitoring of the surface by electronic, optical, or magnetic means.

Controller 202' can be built using many different analog, digital, or combined analog-digital circuits. In system 400, a model MCL 1304 current-regulating diode produced by Motorola of Tempe, Ariz. is used to implement constant-current source 501. A UAF42 Universal Active Filter, produced by Burr-Brown of Tucson, Ariz. is used to implement state-variable filter 504. Audio amplifier 511 was constructed using a model TDA1519UA integrated circuit produced by Philips of Riviera Beach, Fla.

Loudspeaker 104' can be any commercially available loudspeaker having a smooth transfer function below about 1 kHz. For example, a preferred loudspeaker is Model No. MM3500 produced by Polk Audio of Baltimore, Md. Alternatively, other acoustic drivers can be used to generate the antinoise such as electrostatic or piezoelectric transducers.

Accelerometer 200', controller 202', loudspeaker 104', and enclosure 106 can be mechanically coupled to vibrating surface 102 by any number of conventional methods. An important mounting consideration is that accelerometer 200' must adequately sense vibrating surface 102. For example, it has been found that the apparatus performs well when accelerometer 200' is attached, by means of a mounting screw, to the bottom panel of enclosure 106, and enclosure 106 is mechanically fastened to vibrating surface 102. Mounting controller 202' is not critical except for heat-dissipation considerations; the controller may be contained within enclosure 106 or mounted externally. Loudspeaker 104' may be rigidly mounted in enclosure 106. The above-mentioned components can be mounted on vibrating surface 102 using a variety of methods including adhesive bonding and mechanical fasteners. Since vibrating surface 102 imparts mechanical stresses on all components of system 400, it is important that the fastening method be sufficiently robust such that the components do not become loosened or detached from vibrating surface 102 with the passage of time.

To demonstrate technical feasibility, a noise-reduction apparatus was fabricated in accordance with the present invention and fastened to a 10-inch diameter circular plate mounted on top of an electromechanical vibrator. In this way, the plate motion could follow an electrical signal applied to the vibrator. To suppress acoustic radiation from the underside of the plate, the plate-vibrator assembly was enclosed in a plywood box so that only the topside of the plate was exposed. The noise-cancellation system of the present invention was configured as illustrated in FIGS. 4 and 5.

Figure 6:
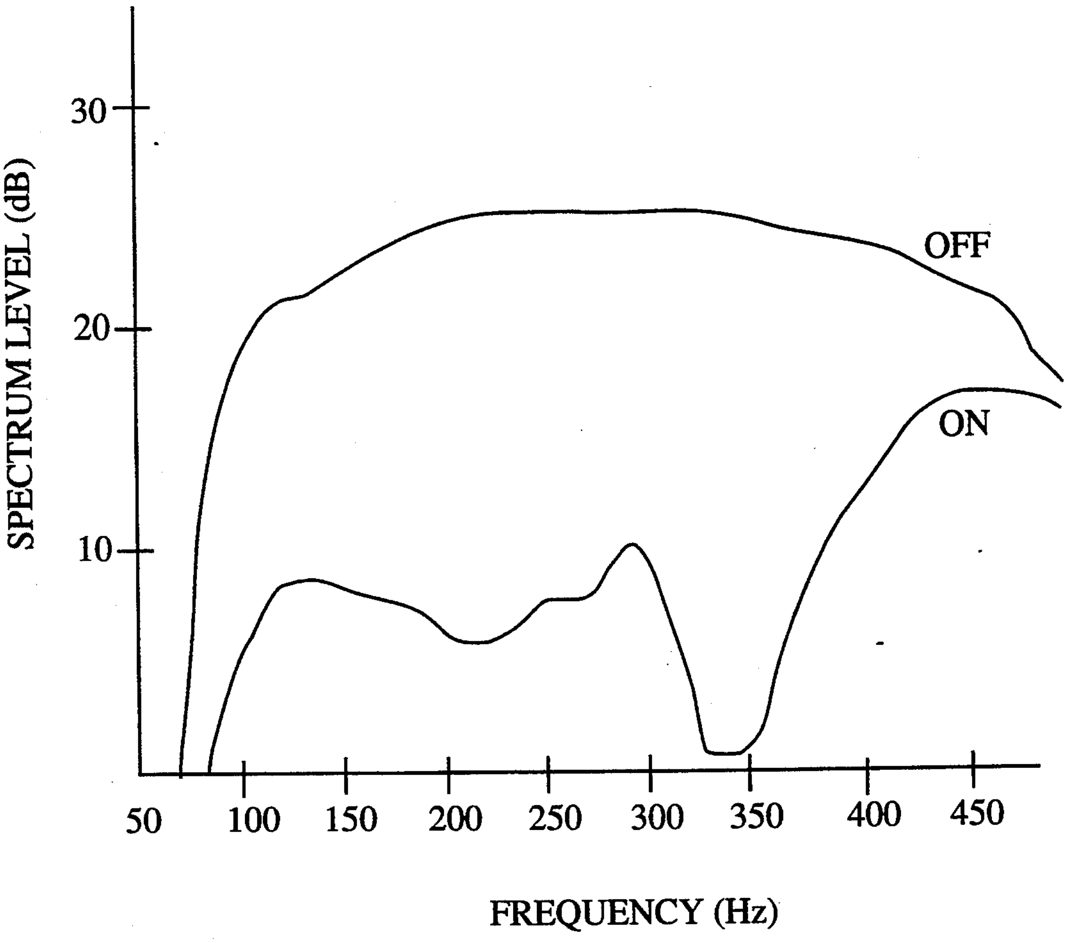
FIG. 6 is a graph depicting noise spectra measured with the active noise-reduction apparatus turned off (upper trace) and turned on (lower trace)
Figure 7A:
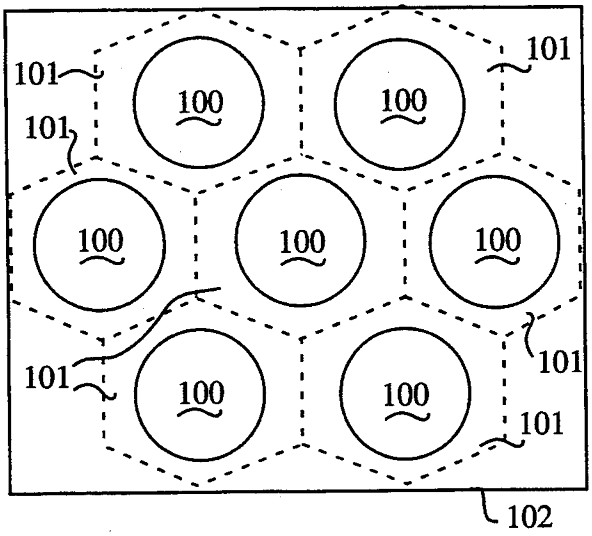
FIGS. 7*a*–7*d* illustrate a number of techniques for placing a plurality of active noise-reduction apparatus on a vibrating surface.
Figure 7C:
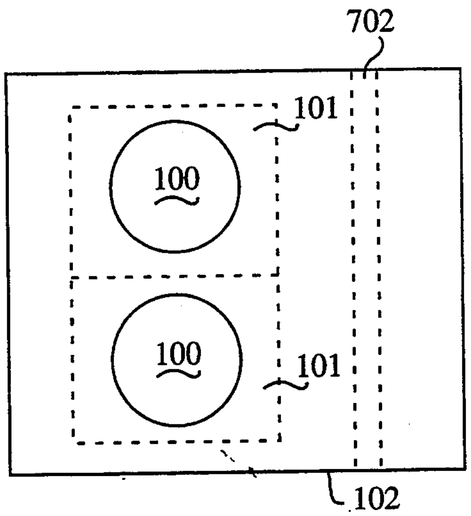
Figure 7B:
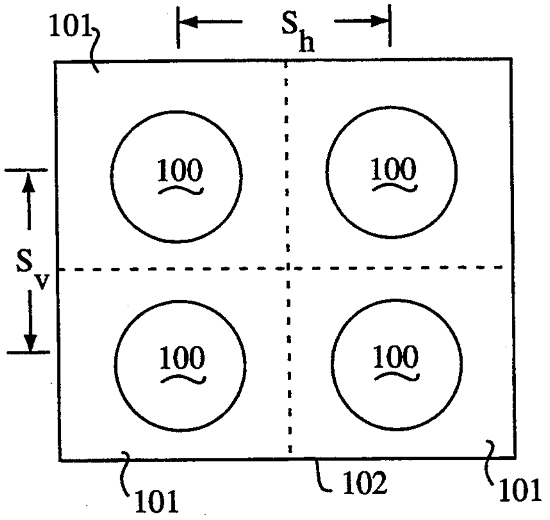
Figure 7D:
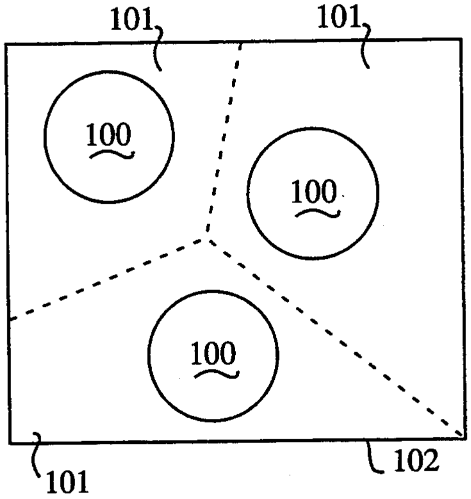

FIG. 6 presents the results of the demonstration; it shows two noise spectra measured on the axis of the loudspeaker and 1 meter from the plate. The upper spectrum was obtained with the apparatus turned off, and the lower spectrum with the apparatus turned on. For this demonstration, the vibrator was excited with a noise signal containing spectral components from 75 to 500 Hz. The single device provided significant performance over the entire band, with a reduction exceeding 10 dB from 120 to 400 Hz.

Although significant noise reduction can be achieved with a single device for small, uniformly moving structures, complex structures will require multiple devices spaced approximately every half wavelength of the structural vibration. FIGS. *7a–7d* illustrate four different ways of placing multiple units of apparatus 100 on vibrating surface 102. In FIG. *7a*, the units are placed on the vibrating surface, in a staggered pattern such that each unit is equally spaced from its six neighbors. Each "unit", i.e. each apparatus 100, is associated with a "portion" or "region" 101 of the vibrating surface 101. This arrangement would be appropriate when the vibrations of the surface are similar in all directions. Another preferred placement is shown in FIG. *7b*, where the vertical spacing $S_v$ and the horizontal spacing $S_h$ between adjacent units are fixed. The placement schemes shown in FIGS. *7a* and *7b* are easy to implement, especially in large, flat vibrating surfaces.

In the scheme of FIG. *7c*, knowledge of the structure beneath vibrating surface 102 is used to help determine where the multiple units of apparatus 100 are to be placed. For example, if a strut 702 is attached to the back of vibrating surface 102, the motion of this surface will be low at the point of its attachment to the strut 702. Therefore, the units of apparatus 100 are placed on vibrating surface 102 away from the strut where, presumably, the vibrations will be of greater amplitude. The advantage of this implementation is that, based on knowledge of the physical properties of the, vibrating structure, the multiple units of apparatus 100 can be more effectively utilized to reduce radiation from regions 101 of vibrating surface 102.

FIG. *7d* is used to illustrate two, additional schemes for placing multiple units of apparatus 100 within regions 101 of vibrating surface 102. In the first instance, multiple units of apparatus 100 are placed in a random pattern on vibrating surface 102. This scheme is likely to be used where there are restrictions on the placement of apparatus 100 due to windows or structure, such as in an aircraft cabin. In a second instance, vibration measurements are taken at various points on vibrating surface 102. An apparatus 100 would then be placed at the points of maximum vibration, which may be distributed randomly on vibrating surface 102 or reflect a certain definable pattern.

With any of the arrangements of FIGS. *7a–7d*, a plurality of apparatus 100 are associated with a plurality of regions 101 of a vibrating surface 102. Each of the apparatus 100 have a motion sensor attached to a region 101 and is operative to convert mechanical motion of the region to which it is attached into a motion signal. Each region 101 produces a regional noise field in the fluid medium (usually air) contacting the vibrating surface 102. A controller having a substantially fixed transfer function produces a regional antinoise signal, and an output transducer (e.g. an acoustic driver such as a loudspeaker) that is located near to the region is operative to produce a regional antinoise field in the fluid medium that is substantially the same amplitude and substantially 180° out-of-phase with the regional noise field. The noise field created by the vibrating surface 102 includes contributions by the regional noise fields and is at least partially canceled by an antinoise field that includes the contributions of the regional antinoise fields.

It should be noted that each unit of apparatus 100 operates substantially independently from all other units. The units are not electrically connected to each other except, perhaps, by means of a common power supply. Of course, several independent control circuits could be housed in one enclosure. Furthermore, mechanical coupling between adjacent units is minimal because the inertial force of the moving components of acoustic driver 104 is small compared to the inertial force of vibrating surface 102. Therefore, apparatus 100 does not substantially change the vibration, or movement, of vibrating surface 102. The output of acoustic driver 104 of any particular apparatus 100 does not affect motion sensor 200 of either the same or any other apparatus 100. As a consequence, feedback between acoustic driver 104 and motion sensor 200 is minimized both within a unit and between units. This lack of feedback simplifies the design of controller 202 and greatly increases system stability.

Preferably, apparatus 100 should cover no more area of vibrating surface 102 than is required by enclosure 106, which is only slightly larger than the piston diameter of acoustic driver 104. Since motion sensor 200 and controller 202 are relatively small devices, they can, in most instances, be placed within enclosure 106 so that apparatus 100 is preferably no larger than enclosure 106.

Apparatus 100 of the present invention is a compact, light-weight and uncomplicated device that can be used in small, medium and large arrays to reduce the noise generated by a complex vibrating surface. Since, the individual units of apparatus 100 are not interconnected, the failure of one or more units will not compromise the entire noise-control system. Since apparatus 100 is attached to vibrating surface 102, the intrusion of equipment into quiet zone Z in medium M is minimized. Furthermore, quiet zone Z is large because the source of antinoise (acoustic driver 104) is very close to the source of undesired noise (vibrating surface 102), permitting early cancellation of wavefront N by wavefront A. See, for example, FIG. 2.

While this invention has been described in terms of several preferred embodiments, there are variations, permutations, and equivalents which also fall within the scope of this invention. It is therefore intended that the following appended claims be interpreted as including all such variations, permutations, and equivalents as fall within the true spirit and scope of the present invention.

What is claimed is:

1. An apparatus for reducing noise radiated from a vibrating surface comprising:

a motion sensor to sense the mechanical movement of a vibrating surface, said vibrating surface developing a broadband noise field having multiple propagation modes in a fluid medium, said motion sensor being operative to convert movement of said vibrating surface into a motion signal;

a controller having a substantially fixed transfer function, said controller being responsive to said motion signal and operative to produce an antinoise signal; and an output transducer responsive to said antinoise signal and operative to produce a broadband antinoise field having multiple propagation modes which is approximately the same amplitude and which is approximately 180° out-of-phase with said noise field, such that said antinoise field and said noise field combine to reduce noise in a quiet zone in said fluid medium without substantially affecting vibrations of said vibrating surface;

wherein at least one of said controller and said output transducer are physically attached to said vibrating surface.

2. An apparatus as recited in claim 1 wherein said motion sensor is selected from a group comprising strain gauges, displacement sensors, velocity sensors, and acceleration sensors.

3. An apparatus as recited in claim 1 wherein said output transducer comprises an acoustic driver having a predetermined piston area and a variable piston velocity.

4. An apparatus as recited in claim 1 wherein said output transducer comprises a loudspeaker.

5. An apparatus as recited in claim 1 wherein said motion sensor is mechanically coupled to said vibrating surface.

6. An apparatus as recited in claim 5 wherein said motion sensor comprises an accelerometer.

7. An apparatus as recited in claim 1 wherein said noise field is a component of a sound field, and wherein said sensor: is substantially unaffected by said sound field.

8. An apparatus for reducing noise radiated from a vibrating surface comprising:

a motion sensor coupled to a vibrating surface, said vibrating surface developing a broadnoise noise field in a fluid medium, said motion sensor being operative to convert movement of said vibrating surface into a motion signal:

a controller having a substantially fixed transfer function, said controller being responsive to said motion signal and operative to produce an antinoise signal; and an output transducer mechanically coupled to said vibrating surface and responsive to said antinoise signal and operative to produce a broadhand antinoise field which is approximately the same amplitude and which is approximately 180° out-of-phase with said broadhand noise field, such that said antinoise field and said noise field combine to reduce noise in a quiet zone in said fluid medium without substantially affecting vibrations of said vibrating surface.

9. An apparatus for reducing noise radiated from a vibrating surface comprising:

a motion sensor coupled to a vibrating surface, said vibrating surface developing a noise field in a fluid medium, said motion sensor being operative to convert movement of said vibrating surface into a motion signal:

a controller having a substantially fixed transfer function, said controller being responsive to said motion signal and operative to produce an antinoise signal; and an output transducer responsive to said antinoise signal and operative to produce an antinoise field which is approximately the same amplitude and which is approximately 180° out-of-phase with said noise field, such that said antinoise field and said noise field combine to reduce noise in a quiet zone in said fluid medium without substantially affecting vibrations of said vibrating surface;

wherein said output transducer comprises an acoustic driver having a predetermined piston area and a variable piston velocity and wherein said antinoise signal excites said acoustic driver such that its piston velocity is approximately equal to the ratio of said noise source area to said piston area, multiplied by the velocity of said noise source.

10. An apparatus for reducing noise radiated from a vibrating surface comprising:

a motion sensor comprising an accelerometer mechanically coupled to a vibrating surface, said vibrating surface developing a noise field in a fluid medium, said motion sensor being operative to convert movement of said vibrating surface into a motion signal;

a controller having a substantially fixed transfer function, said controller being responsive to said motion signal and operative to produce an antinoise signal; and an output transducer responsive to Said antinoise signal and operative to produce an antinoise field which is approximately the same amplitude and which is approximately 180° out-of-phase with said noise field such that said antinoise field and said noise field combine to reduce noise in a quiet zone in said fluid medium without substantially affecting vibrations of said vibrating surface;

wherein said motion sensor, said controller, and said output transducer are attached to said vibrating surface such that the combination of said motion sensor, said controller, and said output transducer does not cover substantially more area of said vibrating surface than the dimensionally largest of said motion sensor, said controller, and said output transducer.

11. A system for reducing broadhand noise radiated from a vibrating surface comprising:

a plurality of active noise-reduction apparatus associated with a plurality of regions of a vibrating surface, wherein each of said plurality of active noise-reduction apparatus includes:

(a) a motion sensor associated with a region of said vibrating surface and operative to convert mechanical motion of said region into a motion signal, said region of said vibrating surface producing a regional broadband noise field in a fluid medium;

(b) a controller having a substantially fixed transfer function, said controller being responsive to said motion signal and operative to produce a regional antinoise signal; and (c) an output transducer responsive to said regional antinoise signal and located proximate to said region and operative to produce a regional broadhand antinoise field in said fluid medium that is substantially the same amplitude and substantially 180° out-of-phase with said regional broadband noise field;

such that at least one of said controller and said transducer are physically attached to said vibrating surface; and such that a noise field comprising a plurality of regional noise fields is at least partially canceled by a cumulative antinoise field comprising a plurality of said regional antinoise fields.

12. A system as recited in claim 11 wherein said plurality of regions of said vibrating surface are substantially regularly spaced.

13. A system as recited in claim 11 wherein said plurality of regions of said vibrating surface are chosen based on knowledge of the structure of said vibrating surface.

14. A system as recited in claim 11 wherein said plurality of regions of said vibrating surface are chosen as areas which create the strongest noise fields.

15. A system for reducing noise radiated from a vibrating surface comprising:

a plurality of active noise-reduction apparatus associated with a plurality of regions of a vibrating surface, wherein said plurality of regions of said vibrating surface are substantially randomly spaced, and wherein each of said plurality of active noise-reduction apparatus includes:

(a) a motion sensor attached to a region of said vibrating surface and operative to convert mechanical motion of Said region into a motion signal said region of said vibrating surface producing a regional noise field in a fluid medium;

(b) a controller having a substantially fixed transfer function, said controller being responsive to said motion signal and operative to produce a regional antinoise signal;

(c) an output transducer responsive to said regional antinoise signal and located proximate to said region and operative to produce a regional antinoise field in said fluid medium that is substantially the same amplitude and substantially 180° out-of-phase with said regional noise field;

such that a noise field comprising a plurality of regional noise fields is at least partially canceled by a cumulative antinoise field comprising a plurality of said regional antinoise fields.

16. A method for reducing noise radiated from a vibrating surface comprising the steps of:

developing a motion signal from the mechanical movement of a vibrating surface which is producing a broadhand noise field in a fluid medium;

transforming said motion signal into an antinoise signal with a controller having a substantially fixed transfer function; and developing with an output transducer a broadhand antinoise field from said antinoise signal, said antinoise field being approximately 180° out-of-phase with said noise field and combining with said noise field in said fluid medium without substantially affecting said mechanical movement of said vibrating surface;

wherein at least one of said controller and said transducer is physically attached to said vibrating surface.

17. A method for reducing noise radiated from a complex vibrating surface comprising the steps of:

dividing said vibrating surface into a plurality of regions, each of which contributes to a broadhand noise field in a fluid medium; and for each selected region of said plurality of regions:

(a) developing a motion signal from the mechanical movement of said selected region;

(b) transforming said motion signal into an antinoise signal with a controller having a substantially fixed transfer function; and (c) developing with an output transducer a broadband antinoise field from said antinoise signal, said antinoise field being approximately 180° out-of-phase with said broadhand noise field and combining with said broadhand noise field in said fluid medium without substantially affecting said mechanical movement of said vibrating surface;

wherein at least one of said controller and said transducer is physically attached to said vibrating surface.

18. An apparatus for reducing noise radiated from a vibrating surface comprising:

a motion sensor coupled to a vibrating surface, said vibrating surface developing a noise field in a fluid medium, said motion sensor being operative to convert movement of said vibrating surface into a motion signal;

a controller having a substantially fixed transfer function, said controller being responsive to said motion signal and operative to produce an antinoise signal; and an output transducer responsive to said antinoise signal and operative to produce an antinoise field which is approximately the same amplitude and which is approximately 180° out-of-phase with said noise field, such that said antinoise field and said noise field combine to reduce noise in a quiet zone in said fluid medium without substantially affecting vibrations of said vibrating surface;

wherein said output transducer comprises an acoustic driver having a predetermined piston area and a variable piston velocity, and wherein said controller has a transfer function given by:

$$H = -\frac{T + A_p/A_s}{X_s X_a}.$$

where H is the transfer function of said controller, T is the acoustic driver transmission transfer function of the acoustic driver, $A_p$ is the noise source area, $A_s$ is the driver piston area, $X_s$ is the driver voltage-to-acceleration transfer function, and $X_a$ is the acceleration-to-voltage transfer function of said motion sensor.

* * * * *